United States Patent [19]

Kurokawa

[11] 4,314,623

[45] Feb. 9, 1982

[54] VIBRATION ISOLATOR

[75] Inventor: Masahito Kurokawa, Tokyo, Japan

[73] Assignee: Kokka Kogyo Kabushiki Kaisha, Tokyo, Japan

[21] Appl. No.: 117,737

[22] Filed: Feb. 1, 1980

[30] Foreign Application Priority Data

Feb. 2, 1979 [JP] Japan .............................. 54-12556[U]

[51] Int. Cl.³ ............................ F16F 7/00; F16F 6/00
[52] U.S. Cl. .................................... 188/267; 188/379
[58] Field of Search ............... 188/1 B, 267, 378, 379; 280/670, 697; 248/638

[56] References Cited

U.S. PATENT DOCUMENTS

3,088,062 4/1963 Hudimac ......................... 188/1 B X
3,770,290 11/1973 Bottalico ......................... 188/267 X

*Primary Examiner*—Duane A. Reger
*Attorney, Agent, or Firm*—Jordan and Hamburg

[57] ABSTRACT

A vibration isolator utilizes a force of magnetic repulsion which is produced by a pair of permanent magnets disposed so that poles of a like polarity oppose to each other. The vibration isolator includes an upper and a lower, annular magnet assembly which are axially magnetized and which are disposed coaxially on a common axis so that their opposing surfaces present poles of a like polarity. The respective magnet assemblies are covered, except for the opposing surfaces, by yoke members of a magnetizable material, whereby a magnetic flux is concentrated across the opposing surfaces of the magnetic assemblies to produce an increased force of magnetic repulsion therebetween. Bearing sleeves are disposed in the central region of each of the magnet assemblies. A connecting shaft has its opposite ends loosely fitted in the respective bearing sleeves, whereby one of the magnet assemblies is coupled to the other so as to be axially movable independently from each other.

6 Claims, 2 Drawing Figures

VIBRATION ISOLATOR

FIELD OF THE INVENTION

The invention relates to a vibration isolator which prevents external vibrations from being transmitted to an instrument or member placed on the isolator, and more particularly, to a vibration isolator which utilizes a force of magnetic repulsion developed by a pair of permanent magnets disposed so that poles of like polarity oppose each other.

It is necessary to prevent a malfunctioning of a high precision instrument such as a record player, an electronic computer, a microscope or roughness meter as a result of external vibrations. Also, in a nuclear power plant or chemical plant, it is necessary to protect piping which provides an interconnection between various equipment from external vibrations. At this end, vibration isolators are interposed between support mounts or bases and members such as instruments or pipings to isolate or attenuate external vibrations. Usually, a vibration isolator comprises a resilient material such as sponge, rubber or metal spring. However, such resilient materials suffer from the likelihood of corrosion or fatigue which may be developed during use over a prolonged period of time. To overcome this difficulty, a vibration isolator is recently proposed which utilizes permanent magnets. The proposed vibration isolator comprises a pair of permanent magnets located so that both N— or S-poles oppose to each other, so that a force of magnetic repulsion developed across the pair of magnets can be utilized to support one of magnets in suspension on which an instrument or member which should be protected from vibrations is placed. The demagnetization of permanent magnets is minimal after their prolonged use, and hence the described isolator experiences little aging effect as compared with the described resilient materials, enabling a stable performance to be achieved.

DESCRIPTION OF THE PRIOR ART

A vibration isolator utilizing permanent magnets is specifically described in Japanese Utility Model Laid-Open Application No. 52-92162 and No. 52-135760. In this prior art, a pair of permanent magnets are vertically spaced within a casing and are located so that pole faces of like polarity oppose to each other. The lower magnet is fixedly mounted on the casing. Each magnet is centrally formed with a vertically extending opening through which a shaft of non-magnetic material extends and is fixedly connected with the upper magnet. Together with the upper magnet, the shaft is disposed so as to be vertically movable through the opening formed in the lower magnet. A load is mounted on the upper magnet or on the free end of the shaft so that the upper magnet with the load imposed thereon is resiliently supported by the force of magnetic repulsion acting between the both magnets. However, the pair of magnets are merely disposed in opposing relationship within the casing, and hence there remains a disadvantage that an increased force of repulsion cannot be developed across the opposing surfaces as a result of influences of leakages from the surfaces other than the opposing surfaces. In addition, when the lower magnet or the shaft is subjected to lateral vibrations, these vibrations are easily transmitted to the upper magnet, resulting in a dissatisfactory arrangement for isolating the precision instrument from oscillations.

SUMMARY OF THE INVENTION

It is an object of the invention to provide a vibration isolator in which leakage fluxes across a pair of oppositely located magnets are minimized to concentrate magnetic flux across the opposing surfaces to produce an increased force of magnetic repulsion therebetween, thus positively preventing an oscillation in the vertical direction.

It is another object of the invention to provide a vibration isolator which includes a connecting shaft extending across a pair of magnets and disposed to be freely slidable relative thereto and in which resilient material is interposed between the shaft and magnets to provide an isolation of vibrations in the lateral direction.

In accordance with the invention there is provided a vibration isolator comprising an upper and a lower magnet assembly each magnetized in the vertical direction and formed with a central opening which extends vertically therethrough, the magnet assemblies being disposed coaxially on a common axis of the central opening so that their opposing surfaces present poles of a like polarity, a pair of yoke members of a magnetizable material disposed on the respective magnet assemblies so as to surround the side and the opposite surface from said opposing surfaces of the individual assemblies, a pair of bearing members disposed in the central openings of the magnet assemblies and each formed with a through-opening in alignment with said axis, and a connecting shaft loosely extending through the through-openings of the pair of bearing members and coupling one of the magnet assemblies to the other so as to be axially movable independently from each other.

In a preferred embodiment of the invention, a resilient ring is disposed in each central opening of the upper and the lower magnet assembly, and each of the bearing members are disposed in the central opening with the resilient ring interposed therebetween.

In the vibration isolator of the invention, the peripheral surface and the other major surface of each magnet assembly which is opposite from the opposing surfaces are covered by the yoke members, which eliminate the occurrence of leakage fluxes. Because the external magnetic field is concentrated across the opposing surfaces of the pair of magnet assemblies, there is produced an increased force of repulsion as compared with conventional arrangement. Since the pair of magnet assemblies are freely movable in the vertical direction along the connecting shaft, an oscillation of the connecting shaft in the vertical direction is not transmitted to the upper magnet assembly. Because the resilient ring is secured in the central opening of the upper magnet assembly, any lateral vibration transmitted to the connecting shaft is absorbed by the resilient ring, and cannot be transmitted to the upper magnet assembly.

DESCRIPTION OF THE PREFERRED EMBODIMENT

Figure 1:
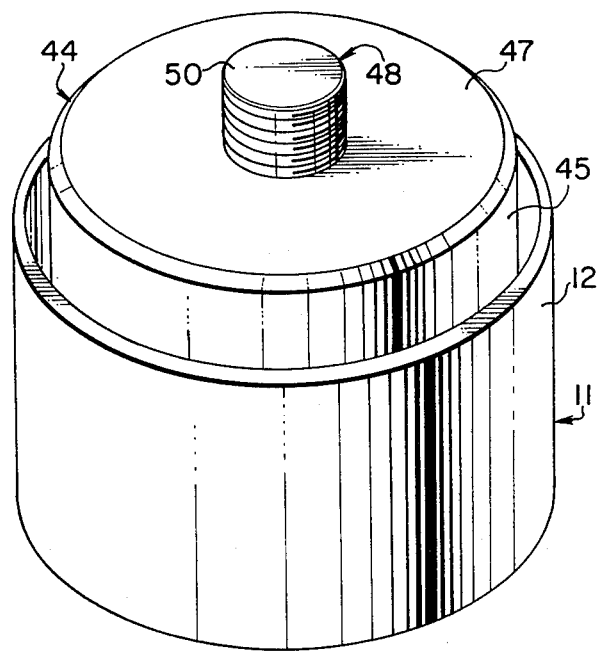
FIG. 1 is a perspective view of a vibration isolator according to one embodiment of the invention.

Referring to the drawings, there is shown a casing 11 which is formed of a non-magnetic material such as aluminium, and which includes a cylindrical sidewall 12 and a bottomplate 13 which is threadably secured to one of open ends of the sidewall 12. The bottomplate 13 is centrally formed with a threaded opening 15 which is engaged by a threaded bolt 14. The bolt 14 is used to secure the vibration isolator on a base plate 16 in an integral manner. The base plate 16 is formed with an opening 17, through which the bolt is inserted to secure the bottomplate 13 to the base plate 16. A cushion ring 18 formed of rubber or synthetic resin is placed on the bottomplate 13, and an annular lower fixing member 19 is secured to the lower surface of the cushion ring 18 as by staking. The lower fixing member 19 is secured to the bottomplate 13 as by screwing or adhesion. An upper fixing member 20 of the similar configuration as the lower fixing member 18 is secured to the top of the cushion 19 as by staking. The upper surface of the upper fixing member 20 is attached to the bottom 22 of a cup-shaped lower yoke member 21 as by adhesion or screwing. The lower yoke member 21 is formed of a magnetically soft material such as iron and includes a side 23 which is integral with the bottom 22. Disposed within the lower yoke member 21 is a first, annular lower permanent magnet 24 and a second lower permanent magnet 25 which is similar in configuration and has the same thickness as the first magnet 24, in coaxial relationship with the lower yoke member 21. These two magnets 24, 25 are formed of a magnetically hard material such as strontium ferrite or the like, and are magnetized so that their upper end faces represent N-poles while their lower end faces represent S-poles. The upper end face of the second lower permanent magnet 25 lies substantially in the same plane as the upper end face of the side 23 of the lower yoke member 21. As a result of such arrangement, the upper end face of the side 23 is magnetized to an S-pole, whereby a magnetic path is formed extending from the upper end face of the second magnet 25 through the upper end of the side 23, through the side 23, its lower end, the bottom 22 and the lower end face of the first magnet 24. In the present embodiment, the lower permanent magnet comprises a pair of permanent magnets shown, but it should be understood that it may comprise a single permanent magnet. A resilient film 26 formed of a magnetically permeable rubber or a synthetic resin is fixedly applied to the upper end faces of the side 23 and the second magnet 25 in order to protect these surfaces. A lower resilient ring 27 formed of a resilient material such as rubber or synthetic resin, preferably butyl rubber, is disposed within the central openings of the lower magnets 24, 25, and includes a disc 28 having a central opening and a rim 29 which is integrally formed with the peripheral edge of the disc 28 and having a given axial length. The outer peripheral surface of the rim 29 is secured to the internal surface of the central openings of the lower magnets 24, 25 as by adhesion or staking. A lower bearing sleeve 30 formed of a metal such as oiless metal is a press fit in the central opening of the disc 28, and has an axial length which is less than the axial length of the rim 29. Spacers 31, 32 formed of a non-magnetic material such as aluminium are fixedly applied to the upper and the lower surfaces of the disc 28. The upper surface of the spacer 31 and the lower surface of the spacer 32 are flush with the upper and lower ends of the bearing sleeve 30.

An upper yoke member 35 is disposed above the lower yoke member 21, and has its open end disposed in facing relationship with the open end of the lower yoke member 21. The upper yoke member 35 is in the form of an inverted cup having a covering 36 and a side 37, both of which are formed of a magnetically soft material similar to that used for the lower yoke member 21. The covering 36 is centrally formed with an opening 38. The axial length of the side 37 on its internal surface is the same as the axial length of the first lower permanent magnet 24. A cylindrical, upper permanent magnet 39 having a central opening which is similarly shaped as the central openings in the lower magnets 24, 25 is fixedly mounted within the upper yoke member 35. The magnet 39 is formed of the same material and has the same thickness or axial length as the first or second lower magnet 24, 25. Thus, the upper magnet has a thickness which is one-half the thickness of the lower magnet assembly. The upper magnet 39 is magnetized so that its axially lower end face represents an N-pole, whereby the lower end of the side 37 is magnetized to an S-pole. In this manner, a magnetic path is formed extending from the lower end face of the permanent magnet 39, through the lower end and the upper end of the side 37, the covering 36 and returning to the upper end face of the magnet 39. An upper resilient ring 40 formed of the same material as the lower ring 27 is secured to the internal surface of the central opening of the magnet 39 as by adhesion or staking. An upper spacer 41 of a non-magnetic material such as aluminium is fixedly mounted in the central opening of the ring 40. Centrally in its upper surface, the upper spacer 41 is formed with a threaded opening 42 of a diameter which is slightly less than the diameter of the opening 38 formed in the upper yoke member 35, and below the threaded opening 42, the bottom of the spacer 41 is centrally formed with a central opening for receiving and securing an upper bearing sleeve 43 therein which is formed of the same material and to the same configuration as the lower bearing sleeve 30. The upper bearing sleeve 43 has an axial length which is sufficient to extend from the lower surface of the upper spacer 41 to project above the lower end of the threaded opening 42. An insulating cover 44 formed of a non-magnetic material such as aluminium is disposed to surround the periphery of the upper yoke member 35, and includes a side 45 having an axial length which is slightly greater than that of the side 37 of the upper yoke member 35, and a covering portion 46 which is integral with the side 45 and which is centrally formed with an opening 46. The opening 46 has a diameter which is the same as that of the opening 38 formed in the upper yoke member 35. An upper fixing bolt 48 includes a threaded shank 49 which is inserted through the opening 46 for threadable engagement with the threaded opening 42. The bolt 47 also includes a knob portion 50 which is integral with the upper end of the shank and has a diameter greater than that of the opening 46 formed in the cover 44. It is to be noted that the shank 48 is formed with an axially extending opening 51.

A connecting shaft 52 formed of a magnetizable material and having a diameter which is less than the internal diameter of the upper and the lower bearing sleeves 43, 30 extend through these sleeves. The shaft 52 has an axial length which permits the upper magnet 39 to be suspended above the lower magnet assembly 24, 25 as a result of the magnetic repulsion acting between the magnet 39 on one hand and the lower magnet assembly 24, 25 on the other when no load is applied to the vibration isolator. Stops 53 having a diameter greater than the sleeves 30, 43 are secured to the axial ends of the shaft 52. Ring-shaped resilient cushions 54 are attached to the lower end of the sleeve 30 and the upper end of the sleeve 43 in order to protect these sleeves if the stops 53 bear against the respective ends of the sleeves as the magnet 39 is driven upward when no load is applied. The bottom 22 of the lower yoke member 21 is centrally formed with an opening 55 of a greater diameter than the stop 53, preventing an interference of the bottom 22 with a downward movement of the connecting shaft 52.

Figure 2:
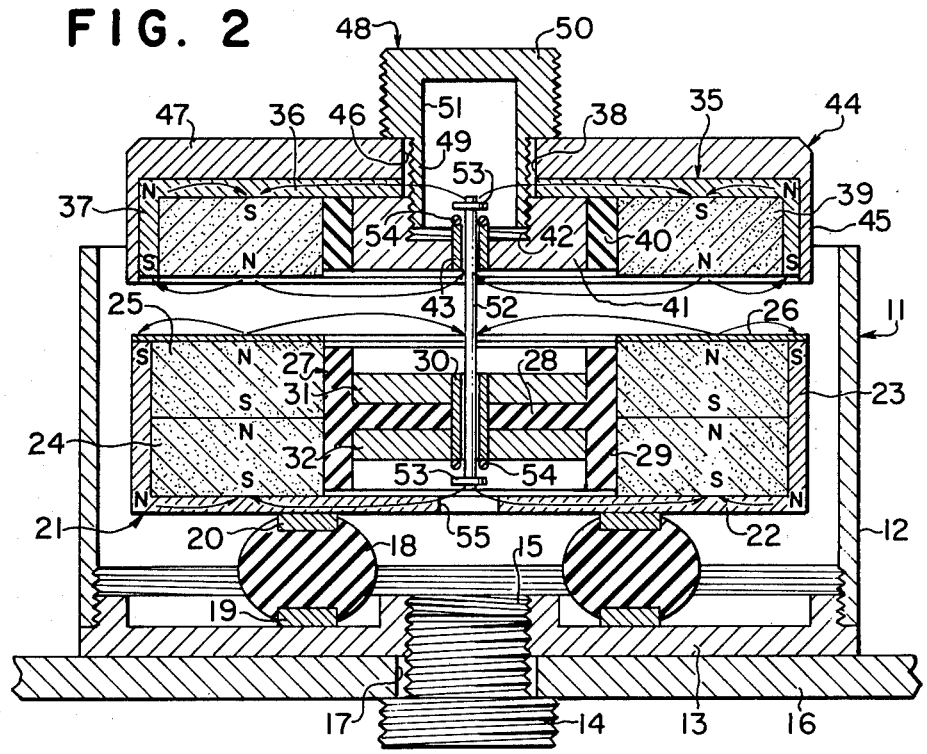
FIG. 2 is a longitudinal section of the arrangement shown in FIG. 1.

In operation, a precision instrument which is to be protected from vibrations is placed on top of the insulating cover 44. The upper magnet 39 tends to move down along the shaft 52 as a result of the gravity of the instrument. However, because the lower pole of the upper magnet 39 and the upper pole of the magnet 25 are both of the same polarity and the opposing end faces of the sides 37, 23 of the upper and lower yoke members 35, 21 present the same S-poles, a magnetic circuit is completed for the flux from the N-pole of the upper magnet 39 which extends through the S-pole on the side 37, the covering 35 of the upper yoke member 35 and returns to the S-pole of the magnet 39 while another magnetic circuit is completed for the flux from the N-pole of the lower magnet 25 which extends through the side 23 and the bottom 22 of the lower yoke member 21 and returns to the S-pole of the lower magnet 24. It will be understood that because the lower magnet assembly 24, 25 has a thickness which is twice that of the upper magnet 39, the magnetic force of the magnetic circuit formed by the lower magnet assembly 24, 25 is greater in magnitude than that of the magnetic circuit formed by the upper magnet 39. Consequently, the upper magnet 39 can be positively maintained in suspension above the lower assembly. The provision of the upper and lower yoke members 35, 21 permits the external magnetic field across the upper and lower magnets 39, 25 to be concentrated into a region located between their opposing surfaces. In this manner, the upper magnet 39 enables the insulating cover 44 with the instrument placed thereon to be maintained in suspension by the force of magnetic repulsion. It will be noted from FIG. 2 that the shaft 52 is also magnetized as a result of the magnetic path formed by the magnets 24, 25 and 39. Specifically, the opposite ends of the shaft 52 will exhibit N-poles while its intermediate portion will exhibit an S-pole. Consequently, the shaft 52 is maintained in suspension rather than being magnetically attracted to one of the magnets. If the baseplate 16 is subject to a vertical oscillation, the oscillation is transmitted to the casing 11 with a certain degree of absorption taking place by the cushion ring 19. The remainder of the oscillation will be transmitted to the lower magnets 24, 25. However, because there is a clearance between the lower magnets 24, 25 and the upper magnet 39, the air cushion formed provides an absorption. The shaft 52 is maintained in suspension within the upper and lower sleeves 43, 30, so that no oscillation is transmitted to the upper magnet 39 through the shaft 52. In the event the base plate 16 or the casing 11 is subjected to lateral vibrations, the cushion ring 19 provides a certain degree of absorption, and any remaining magnitude of the vibrations will be transmitted to the upper magnet 39 through the shaft 52. However, the presence of the resilient ring 40 which is interposed between the upper magnet 39 and the shaft 52 provides an absorption of the lateral vibrations. The transmission of the lateral vibrations to the shaft 52 can be further reduced by providing the resilient ring 27 between the magnets 24, 25 and the shaft 52.

While it has been assumed above that the oscillation occurred to the base plate 16 or to the members associated with the lower magnets 24, 25, any oscillation caused by the instrument placed on the insulating cover 44 can be similarly absorbed or alleviated. While in the embodiment described above, the magnets are constructed as annular magnets, it will be appreciated that rectangular or polygonal magnets may also be provided which are centrally formed with vertically extending openings.

What is claimed is:

1. A vibration isolator comprising an upper and a lower magnet assembly each magnetized in the vertical direction and formed with a central opening which extends vertically therethrough, the magnet assemblies being disposed coaxially on a common axis of the central opening so that their opposing surfaces present poles of a like polarity, a pair of yoke members of a magnetizable material disposed on the respective magnet assemblies so as to surround the side and the opposite surface from said opposing surfaces of the individual magnet assemblies, a pair of bearing members disposed in the central openings of the magnet assemblies and each formed with a through-opening in alignment with said axis, and a connecting shaft of magnetizable material loosely extending through the through-openings of the pair of bearing members and coupling one of the magnet assemblies to the other so as to be axially movable independently from each other.

2. A vibration isolator according to claim 1 in which each of the bearing members is mounted in the central opening of the individual magnet assemblies with a resilient material interposed therebetween.

3. A vibration isolator according to claim 1, further including a covering of a non-magnetic material which surrounds the outer periphery of the yoke member associated with the upper magnet assembly.

4. A vibration isolator according to claim 1 in which a resilient material is secured to the bottom of the yoke member associated with the lower magnet assembly.

5. A vibration isolator according to claim 1 in which the lower magnet assembly produces a field strength which is greater than that of the upper magnet assembly.

6. A vibration isolator according to claim 1 wherein said connecting shaft is constructed and disposed so as to be magnetized as a result of the magnetic path formed by said magnet assemblies with the ends of said shaft exhibiting different polarity from the intermediate portion of the shaft, whereby said shaft is thereby maintained in suspension so that oscillation is not transmitted to said magnetic assemblies through said shaft.

* * * * *